(12) United States Patent
Sordo et al.

(10) Patent No.: US 8,175,511 B1
(45) Date of Patent: May 8, 2012

(54) TECHNIQUES FOR INTELLIGENT NETWORK-BASED TEACHING

(75) Inventors: Mark Sordo, Santa Cruz, CA (US); Kevin McClure, San Francisco, CA (US)

(73) Assignee: GlobalEnglish Corporation, Brisbane, CA (US)

( * ) Notice: Subject to any disclaimer, the term of this patent is extended or adjusted under 35 U.S.C. 154(b) by 1465 days.

(21) Appl. No.: 11/164,726

(22) Filed: Dec. 2, 2005

Related U.S. Application Data

(63) Continuation-in-part of application No. 11/160,098, filed on Jun. 8, 2005.

(60) Provisional application No. 60/596,037, filed on Aug. 25, 2005.

(51) Int. Cl.
*G09B 7/00* (2006.01)

(52) U.S. Cl. ........ 434/350; 434/322; 434/323; 434/353; 434/118

(58) Field of Classification Search .................. 434/118, 434/236, 322, 323, 350, 362, 353; 705/23; 706/45, 59
See application file for complete search history.

(56) References Cited

U.S. PATENT DOCUMENTS

| | | | | |
|---|---|---|---|---|
| 6,112,049 A | * | 8/2000 | Sonnenfeld | 434/350 |
| 6,118,973 A | * | 9/2000 | Ho et al. | 434/362 |
| 6,149,441 A | * | 11/2000 | Pellegrino et al. | 434/350 |
| 6,162,060 A | * | 12/2000 | Richard et al. | 434/118 |
| 6,322,366 B1 | * | 11/2001 | Bergan et al. | 434/118 |
| 6,343,319 B1 | * | 1/2002 | Abensour et al. | 709/219 |
| 6,347,943 B1 | * | 2/2002 | Fields et al. | 434/118 |
| 6,370,355 B1 | * | 4/2002 | Ceretta et al. | 434/350 |
| 6,470,171 B1 | * | 10/2002 | Helmick et al. | 434/362 |
| 6,554,618 B1 | * | 4/2003 | Lockwood | 434/322 |
| 6,606,480 B1 | * | 8/2003 | L'Allier et al. | 434/362 |
| 6,651,071 B1 | * | 11/2003 | O'Brien et al. | 707/102 |
| 6,669,485 B2 | * | 12/2003 | Thean et al. | 434/365 |
| 6,732,090 B2 | * | 5/2004 | Shanahan et al. | 707/3 |
| 6,884,074 B2 | * | 4/2005 | Theilmann | 434/118 |
| 6,921,268 B2 | * | 7/2005 | Bruno et al. | 434/323 |
| 6,975,833 B2 | * | 12/2005 | Theilmann et al. | 434/350 |
| 6,978,115 B2 | * | 12/2005 | Whitehurst et al. | 434/350 |
| 7,050,753 B2 | * | 5/2006 | Knutson | 434/350 |
| 2002/0087416 A1 | * | 7/2002 | Knutson | 705/23 |
| 2002/0188583 A1 | * | 12/2002 | Rukavina et al. | 706/45 |
| 2003/0152903 A1 | * | 8/2003 | Theilmann | 434/350 |
| 2003/0154176 A1 | * | 8/2003 | Krebs et al. | 706/59 |
| 2003/0211447 A1 | * | 11/2003 | Diesel et al. | 434/118 |
| 2004/0063085 A1 | | 4/2004 | Ivanir et al. | |
| 2004/0078204 A1 | | 4/2004 | Segond et al. | |
| 2004/0191744 A1 | | 9/2004 | Guirguis | |
| 2004/0248074 A1 | | 12/2004 | Hoyashita et al. | |

\* cited by examiner

*Primary Examiner* — Xuan Thai
*Assistant Examiner* — Alvin Carlos
(74) *Attorney, Agent, or Firm* — Aka Chan LLP

(57) ABSTRACT

An e-learning system that provides a customized e-learning experience for a user. Information is received from a user identifying the user's learning objectives. Based upon the user's objectives, a study plan that is customized for the user is developed. The study plan may comprise one or more course units that the user can access through a server using a client system used by the user. User activity is monitored, including the user's activity within the e-learning system and outside the e-learning system. Information is recorded regarding the user's progress and performance. This information is used to modify the study plan, as appropriate for the user.

20 Claims, 6 Drawing Sheets

TECHNIQUES FOR INTELLIGENT NETWORK-BASED TEACHING

The present application is a continuation-in-part (CIP) application of U.S. patent application Ser. No. 11/160,098, filed Jun. 8, 2005, and also claims the benefit of U.S. provisional patent application No. 60/596,037, filed Aug. 25, 2005, which are incorporated by reference along with the cited references in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

An appendix is submitted with this application as a text file attachment.

BACKGROUND OF THE INVENTION

The present invention relates to e-learning systems and more particularly to techniques for providing customized teaching services to individual users via a communication network such as the Internet, thereby improving the overall learning experience of the user.

Education is one of the most important segments and industries of modern society, and provides the foundation for future development and success of our society. Traditionally, instruction has been provided through classrooms. However, the advent of the computer age and widespread use of communication networks such as the Internet have completely revolutionized the way in which educational services are provided to users. With the proliferation of virtual classrooms and on-line courses, users can participate in learning activities irrespective of their geographical location, time zone, schedules, or handicaps. This field of providing education or learning services in a networked environment is commonly referred to as electronic learning or e-learning.

E-learning offers several advantages over traditional classroom-based education. A single e-learning system can reach a wide array of users (many more users than conventional classroom education) irrespective of a user's location. As long as a user has access to a computer system that can access an e-learning system, a user with just a few mouse clicks can register for and participate in the e-learning process. E-learning allows users to participate in learning activities from the convenience of their homes. The costs associated with e-learning are also typically lower than those associated with traditional classroom-based education.

While e-learning offers several advantages over classroom-based education, the quality of education and the personalized attention to students provided by a live teacher in a traditional classroom are often missing in conventional e-learning systems. Most study programs offered by conventional e-learning systems do not take into account a user's real-world needs, strengths, and weaknesses. Some e-learning systems administer an assessment test or an initial interview and suggest a course of study based upon the assessment. However, the course is generally static and does not change or mold itself to the user's needs as the user progresses through the course. Conventional e-learning systems are unable to provide a continuous evaluation of the user's changing ability and needs.

Therefore, it is desirable to provide e-leaning systems and e-learning techniques that offer a customized and flexible e-learning experience for a user based upon the user's goals and abilities, thereby providing a much richer and effective e-learning experience for the user.

SUMMARY OF THE INVENTION

Embodiments of the present invention provide an e-learning system that provides a customized e-learning experience for a user. Information is received from a user identifying the user's learning objectives. Based upon the user's objectives, a study plan that is customized for the user is developed. The study plan may comprise one or more course units that the user can access through a server using a client system used by the user. User activity is monitored, including the user's activity within the e-learning system and outside the e-learning system. Information is recorded regarding the user's progress and performance. This information is used to modify the study plan, as appropriate for the user.

In an embodiment, the invention is a method of providing an e-learning service including: storing, at a server system, curriculum information comprising information identifying a plurality of concepts and information identifying a plurality of resources; receiving, at the server system, information for a user, the information identifying a set of one or more user objectives; and determining a set of one or more concepts from the plurality of concepts based upon the set of user objectives. The method further includes creating a study plan for the user based upon the curriculum information and the set of one or more concepts, the study plan comprising one or more course units, each course unit accessible by the user from the server using a client system connected to the server via a communication network.

In an embodiment, the invention is a method performed by a computer system providing an e-learning service including: storing curriculum information comprising information identifying a plurality of concepts and information identifying a plurality of resources; receiving information for a user identifying a first user objective; and creating a student model for the user. The student model includes: information identifying a set of one or more concepts determined from the plurality of concepts based upon the first user objective; information identifying a study plan for the user, the study plan determined based upon the curriculum information and the set of one or more concepts, the study plan comprising one or more course units, each course unit accessible by the user from a server using a client system connected to the server via a communication network.

Other objects, features, and advantages of the present invention will become apparent upon consideration of the following detailed description and the accompanying drawings, in which like reference designations represent like features throughout the figures.

DETAILED DESCRIPTION

In the following description, for the purposes of explanation, specific details are set forth in order to provide a thorough understanding of the invention. However, it will be apparent that the invention may be practiced without these specific details.

Figure 1:
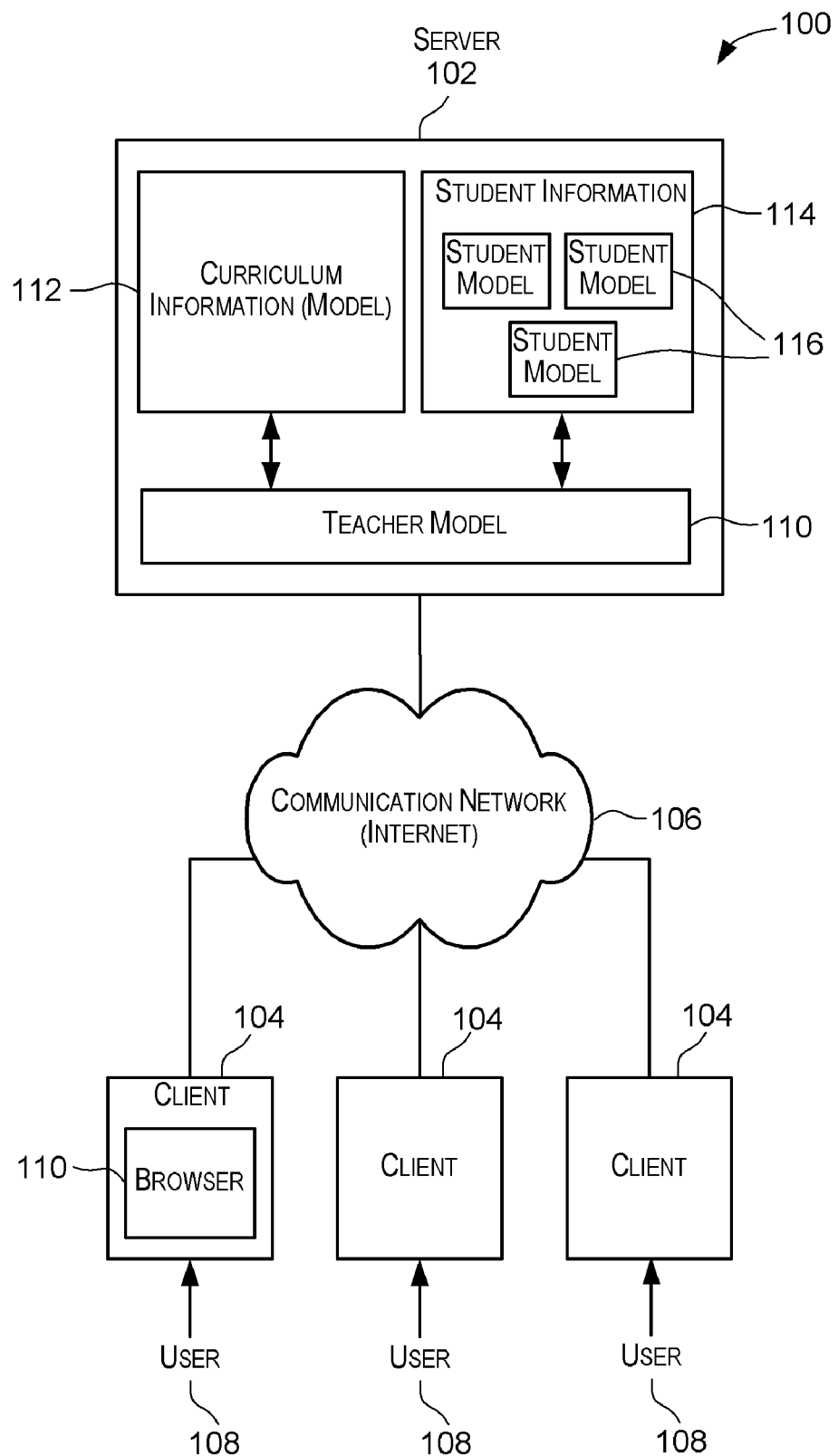
FIG. 1 is a simplified block diagram of a distributed computer network incorporating an e-learning system according to an embodiment of the present invention.

FIG. 1 is a simplified block diagram of a distributed computer network 100 incorporating an e-learning system according to an embodiment of the present invention. Computer network 100 comprises an e-learning server system 102 and a number of client systems 104 connected to a communication network 106 via a plurality of communication links. Communication network 106 provides a mechanism for allowing the various systems of distributed network 100 to communicate and exchange information with each other.

Communication network 106 may itself be comprised of many interconnected computer systems and communication links. The communication links may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 106 is the Internet, in other embodiments, communication network 106 may be any suitable communication network including a local area network (LAN), a wide area network (WAN), a wireless network, an intranet, a private network, a public network, a switched network, and combinations of these, and the like.

Distributed computer network 100 depicted in FIG. 1 is merely illustrative of an embodiment incorporating the present invention and does not limit the scope of the invention as recited in the claims. One of ordinary skill in the art would recognize other variations, modifications, and alternatives. For example, more than one e-learning server system 102 may be connected to communication network 124. As another example, client systems 104 may be connected to server 102 via communication network 106 (as shown in FIG. 1), or may be directly connected to server 102, or may be connected to server 102 via an access provider or some other server system.

Client systems 104 typically request information and/or services from a server 102. Server system 102 is configured to service the requests received from client systems 104. For this reason, a server system typically has more computing and storage capacity than client systems. However, a particular computer system may act as both as a client or a server depending on whether the computer system is requesting or providing information and/or services. Additionally, although the invention has been described using a client-server environment, it should be apparent that the invention is not restricted to this environment.

According to an embodiment of the present invention, server 102 is configured to provide e-learning services. A user 108 may use a client system 104 to receive and interact with e-learning services provided by server 102. A user may interact with e-learning services provided by server 102 using an application program 110 executing on client system 104. In one embodiment, a user may use a web browser executing on a client system to access e-learning services provided by server 102 via a communication network such as the Internet. Examples of browsers include Microsoft's Internet Explorer, Netscape Navigator, Mozilla Firefox, Opera, and others. Other types of application programs may also be used to in alternative embodiments such as e-mail programs (e.g., Microsoft Outlook, Eudora, Pegasus Mail, Mozilla Thunderbird), word processing programs (Microsoft Word, WordPerfect, WordStar, OpenOffice), and others. In general, the application program executing on a client system 104 provides the interface for the user to provide information to e-learning server 102 and to receive information from server 102. Examples of a client system include a desktop computer, a laptop, a portable system, a personal digital assistant (PDA), a mobile communication device such as a cellular phone, a kiosk, and others.

Server 102 may provide different types of e-learning services including services that facilitate teaching of one or more subjects or concepts to users. For example, in one embodiment, server 102 may be configured to provide learning services that facilitate learning of a language such as English, Spanish, German, and others. A specific embodiment of an e-learning system offering language learning services is the courses offered by GlobalEnglish Corp. Via these courses, GlobalEnglish offers comprehensive, high-quality English language instruction that is available to students or users anytime and anywhere they have access to a communication network such as the Internet. The user does not have to schedule classes or travel to participate in the learning process. This not only provides an enhanced level of convenience for the user but also provides time and cost savings. Users get state-of-the-art on-line multimedia instruction, developed specifically for their needs. For example, business people can get instruction tailored for their business professional needs, children are offered appropriate instruction to solve their needs, and the like. Users can learn the necessary skills at their own pace, and can track their results and achievements.

For purposes of describing features of the present invention, a specific e-learning system is described that is directed to teaching English language. The teachings of the present invention may however be also applicable to other types of e-learning including learning other languages, improving basic skills such as reading, writing, and comprehension, arithmetic skills, course work or instruction for a specific field such as anthropology, architecture, art, music, psychology, medicine, chemistry, science, business, religion, teaching, military science, electrical engineering, computer science, chemical engineering, civil engineering, and the like. Furthermore, the e-learning system embodiments described in this patent provides several concepts and features. An e-learning system according to the teachings of the present invention may incorporate combinations of these concepts and features as well as other concepts and features. Teachings of the present invention may also be modified as needed for particular e-learning applications.

The e-learning functionality provided by server 102 may be implemented using one or more modules. In the embodiment depicted in FIG. 1, the e-learning system modules include a teacher model module 110 that is responsible for performing processing performed by the e-learning system. Teacher model 110 provides customized e-learning services for a user based upon student information 114 and curriculum information 112 (also referred to as "curriculum model 112").

In one embodiment, teacher model 110 is configured to create a customized study plan (or learning path) for each user based upon the user's learning objective or objectives, or upon the user's knowledge, or a combination of these. Teacher model 110 is configured to monitor a user's interactions with the e-learning system and update the study plan as appropriate based upon the user's needs and performances. In this manner, teacher model 110 is configured to provide a customized e-learning experience for user that is personalized for the user based upon the user's goals, weaknesses, and strengths. Further details related to teacher model 110 are provided below.

Student information 114 comprises information related to users (or students) of learning services provided by the e-learning system. In one embodiment, student information 114 comprises a student model 116 that is created and stored for each user of the e-learning system. A student model 116 for a user represents the e-learning system's understanding of that user's learning goals, the user's progress through a learning course, the user's weaknesses and strengths, and other information related to the user that is relevant for providing a customized e-learning experience for the user. A student model 116 for a user may be spread over several courses and curricula. Further details related to a student model 116 are provided below.

Curriculum information 112 (or curriculum model 112) comprises information identifying a set of concepts that a user can learn using services provided by the e-learning system. A concept may identify a skill or topic that a user can learn, e.g., present tense, active voice, spelling, and the like. Curriculum information 112 may also comprise information identifying a set of resources that are available for learning the concepts. Further details related to curriculum model 112 are provided below.

Teacher model 110 represents the intelligence and processing level of the e-learning system. Curriculum model 112 and student information 114 represent the data level of the e-learning system. The data level stores information about users (or learners or students) of the e-learning system and also about learning resources provided by the e-learning system. The learning resources may include information about resources such as skills courses, tests, proficiency courses, and others.

The functionality of the e-learning system may be implemented using software modules (e.g., software instructions or code) executed by a processor, hardware modules, or combinations thereof. One or more programming languages may used to implement the modules including but not restricted to JavaScript, C#, C, C++, Pascal, Fortran, Perl, SAS, SPSS, and Java, and others. The computer software product may be implemented as an independent application with data input and data display modules. The computer software product may also be implemented in the form of classes that may be instantiated as distributed objects. The computer software products may be based upon software components such as Java Beans (from Sun Microsystems) or Enterprise Java Beans (EJB from Sun Microsystems). A suitable operating system may be used by the e-learning system such as Microsoft Windows® family of operating systems (e.g., Windows 95, 98, Me, Windows NT, Windows 2000, Windows XP, Windows Vista, Windows CE, Windows Mobile), Linux, UNIX, Sun OS, and others.

It should be understood that the components of e-learning system 102 depicted in FIG. 1 are merely illustrative of an embodiment of the present invention and do not limit the scope of the invention. One of ordinary skill in the art would recognize other variations, modifications, and alternatives.

Additional modules and information may also be used in alternative embodiments. For example, the e-learning system may also comprise one or more modules that are resident on and executed by client systems 104 or by other systems communicatively connected with server 102. The modules resident on a client system 104 may be configured to monitor a user's interactions with the client system and to provide information regarding the interactions to server 102. Server 102 may use this information to track a user's learning progress and also to create a customized study plan for the user.

Figure 2:
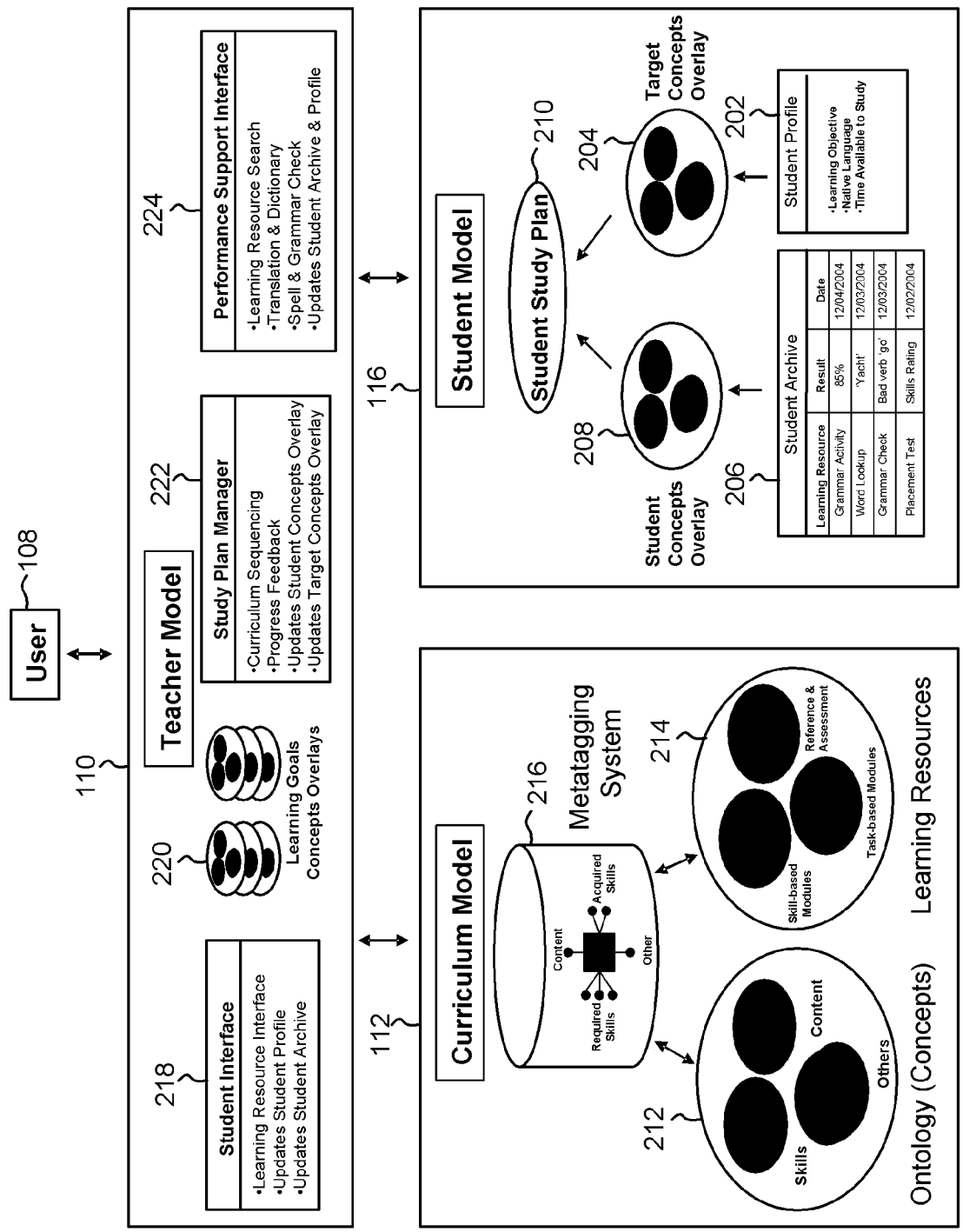
FIG. 2 depicts a diagram of a student model, curriculum model, and teacher model according to an embodiment of the present invention.

FIG. 2 depicts a diagram of a student model 116, curriculum model 112, and teacher model 110 according to an embodiment of the present invention. As previously stated, student information 114 depicted in FIG. 1 comprises a student model 116 that is created by the e-learning system and stored for each user of the e-learning system. A user (also called a student or learner) is typically a person who uses services provided by server 102. Student model 116 for a user represents the learning system's understanding of the user's learning goals, the user's progress through a learning course, the user's weaknesses and strengths, and other information related to the user that is relevant for providing a customized e-learning experience for the user. Student model 116 may comprise several pieces of information. In the embodiment depicted in FIG. 2, student model 116 for a user comprises Student Profile information 202, Target Concepts Overlay information 204, Student Archive information 206, Student Concepts Overlay information 208, and a Student Study Plan information 210.

Student profile 202 for a user comprises information related to one or more user attributes that together form a user's profile. Examples of attributes include attributes that identify a user's learning goals or objectives, background information about the user, and other user-related information. A user objective identifies what a user desires to learn using the e-learning system. User objectives may vary from user to user. Examples of a user's goals/objectives include: improve oral communication skills, improve written English skills, improve vocabulary, improve reading and comprehension skills, acquire skills for a specific exam (e.g., TOEFL or TOEIC), improve specific job-related skills, and the like. Other examples of user-related attributes include: information identifying a user's native language, information identifying other languages known to the user, time available to the user for the learning process, geographical location of the user, the user's occupation, and the like. Various other attributes may also be included in student profile information 202.

Student profile information 202 is used by the e-learning system for various purposes. In one embodiment, student profile information 202 is used to build a target concepts overlay 204 for a user. The information stored in student profile 202 is also used to build a customized study plan for the user. For example, the objectives information stored in the student profile are used to build a study plan for a user. As another example, depending upon the amount of time a user has to complete the learning process, the e-learning system alters the study plan to achieve the user's objectives in view of the time constraints.

Information that is used to build the student profile 202 for a user is generally provided or received from the user. The information may be solicited from the user using various techniques such as the initial needs assessment, questionnaires filled out by a user, information provided by a user to a representative of the e-learning system, and the like.

Student profile 202 may be updated during the course of the learning process. A user may also be allowed to make changes to the student profile information during the course of the learning process. For example, a user may change his learning goals by adding a new goal (e.g., to learn how to answer business telephone calls) and this change is reflected in the student profile information. A user thus has great flexibility and control over the user's e-learning experience. Changes to the student profile information may result in changes to target concepts overlay information 204 and the user's study plan 210.

Target concepts overlay (TCO) 204 for a user comprises information representative of a user's learning objectives in terms of concepts that are offered for learning by the e-learning system. In one embodiment, each user-provided learning objective (from the student profile information) is translated to one or more concepts that a user is recommended to master in order to achieve the user's objective. The one or more concepts are selected from a set of concepts (or ontology of concepts 212) offered by the e-learning system. Accordingly, TCO information 204 represents a subset of concepts (which may even be all the concepts in a particular scenario) from the ontology of concepts 212 offered by the e-learning system that a user is recommended to master in order to achieve the user's objectives.

In one embodiment, the TCO information is created and maintained by teacher model 110 based upon the user's student profile information 202 or from information provided by the user (e.g., from the initial needs assessment, questionnaires, and the like). Parts of TCO information 204 may also be manually configured by providers of the e-learning system based upon the user's assessment and based upon the student profile information.

Student archive 206 for a user is a record of the user's interactions and usage of learning resources offered by the e-learning system. Date and performance rating (or score) information may be associated with the archive information. Student archive information 206 provides evidence for the mastery ratings and confidence scores in the Student Concepts Overlay information 208 for the user, as described below. An example of student archive information is depicted in FIG. 2. As shown in FIG. 2, student archive 206 comprises information identifying learning resources, results/ratings associated with the learning resources, and a date of the result. The information depicted in FIG. 2 indicates that the user completed a Grammar Activity with a score of 85 percent on Dec. 4, 2004, looked up a word "Yacht" on Dec. 3, 2004, received the information that grammar check identified an incorrect use of the verb "go" on Dec. 3, 2004, and received a skill rating for a placement test conducted in Dec. 2, 2004. Student archive 206 is continually updated based upon the user's interactions with the e-learning system.

Student concepts overlay (SCO) 208 for a user comprises information representative of the e-learning system's evaluation of how well the user has mastered each concept in the TCO 204 for the user. As described above, TCO information 204 for a user identifies one or more concepts from the ontology of concepts that a user is recommended to learn in order to achieve the user's objectives. The SCO information 208 for the user represents the user's current understanding of concepts identified in the TCO information. For example, for each concept in TCO information 204, SCO information 208 may store information indicating whether or not the user has mastered the concept or the degree to which the user has mastered the concept.

Various techniques may be used to represent SCO information 208. In one embodiment, a mastery rating and a confidence score are provided for each concept included in TCO information 204. The mastery rating for a concept indicates the user's degree of mastery or understanding of that concept.

For example, in one embodiment, the mastery rating is a simple percentage score of how many times the user has correctly answered a question related to the concept or has used the concept correctly in some context. The confidence score for the concept indicates the e-learning system's confidence in the mastery rating. The confidence score is based on a belief that a user needs to be tested on a concept multiple times before the system can be 100 percent confident in evaluating how well the user has mastered the concept. Accordingly, the confidence score will be higher when the e-learning system, has had greater or more opportunity to observe a user being evaluated on a concept. For example, the confidence rating will be higher when a student has passed a test on a concept two or more times, rather than just once—the greater number of times a user has passed a test or evaluation for a concept, the higher the confidence score for that concept. More recent results will be given greater weight in the overall rating.

For example, consider a scenario where, for a particular concept "A," a user has answered seven out of ten questions related to the concept correctly. Accordingly, the mastery rating for concept "A" for the user is 70 percent. Assuming that answering 20 questions correctly for concept "A" represents a 100 percent confidence score, the confidence score for the user is 10/20 or 50 percent.

Information from student archive 206 is used to update the information in the SCO 208. For example, the information in student archive 206 provides the evidence for the ratings associated with the concepts in SCO 208 and the confidence scores associated with the ratings. SCO information 208 is continually updated based upon the user's interactions with the e-learning system. In one embodiment, a user is determined to have met the user's learning objectives when the user has mastered all the concepts in the user's TCO as indicated by the SCO information.

Study plan 210 for a user is an individualized learning path created by the e-learning system for the user to achieve the user's objectives. Study plan 210 is sometimes also referred to as a course of study. A study plan for a user may include individual course units. A course unit is a single unit of study and may be directed to a single concept or multiple concepts. Each course unit comprises learning resources that are presented to the user. The learning resources may comprise skill-based modules, task-based modules, and other learning activities (e.g., tests, questions, interactive dialogs, and others), and the like. The study plan thus identifies a set of one or more course units that a user is recommended to take in order to learn the concepts in the TCO for the user (which in turn are determined based upon the user's objectives).

In addition to identifying the course units, study plan 210 may also store information indicating the ordering or sequencing between one or more of the course units. For example, if the study plan recommended for a user comprises of five course units CU1, CU2, CU3, CU4, and CU5, the study plan may indicate that course units CU1, CU2, and CU3 are to be taken in sequence (i.e., C1 is a prerequisite for C2 and C2 is a prerequisite for C3). Course units CU4 and CU5 may not have any ordering restrictions. This may be represented as follows:

Course of Study: CU1→CU2→CU3, CU4, CU5

Study plan 210 is a dynamic entity and may change based upon the user's interactions with the learning system and based upon changing user needs and objectives, the user's performance (strengths and weaknesses as gauged by the e-learning system), and other user conditions. Information stored in SCO 208, TCO 204, student archive 206, and student profile 202 influences the study plan developed for a particular user. For example, if a user changes an objective in the student profile, this in turn may change the TCO for the user, which in turn may influence and change the study plan for the user.

Several different techniques may be used to initialize and update a student model 116 for a user. As previously indicated, a user may provide information that is used to build student profile information. For example, a user may fill out the initial needs assessment and the results of the placement test may be used to initialize the student profile 202 of the user. The initial needs assessment may be offered on-line by the e-learning system and may be a prerequisite for using the e-learning system. Paper-based needs assessment may also be used in alternative embodiments. The placement test may be prepared by providers of the e-learning system. In alternative embodiments, results of standardized placement tests or other tests, which may or may not be administered by providers of the learning system, may also be used to build a student model 116 for a user. Information may also be provided by the user using other means such as questionnaires, interviews, and the like.

Student profile information 202 is used to determine concepts that a user is recommended to learn in order to achieve the user's objective. A TCO 204 is built for the user based upon the concepts. A set of course units are then determined for the user based upon the TCO 204 and the SCO 208 for the user. A study plan 210 is built for the user based upon the determined set of course units. The user's interaction with the e-learning system is then monitored and the student archive 206 updated accordingly. The student archive information is used to provide the ratings and confidence score for the SCO 208 for the user. Each of the components of student model 116 for a user is continually updated to reflect the changing user's goals and progress through the learning process.

Curriculum model 112 stores information identifying the curriculum offered by the e-learning system. In the embodiment depicted in FIG. 2, curriculum model 112 comprises ontology of concepts 212, learning resources 214, and a meta-tagging system 216.

Ontology 212 describes concepts that a user can learn using the e-learning system. The concepts may be hierarchically organized. A concept may identify a skill or topic that a user can learn and may depend on the context of the e-learning system application. For example, for an e-learning system configured to provide services for learning the English language, the concepts provided by the system may include concepts such as tenses, active and passive voice, listening for the main idea, pronunciation, spelling skill, and others. An ontology is one way of storing the concepts information. Other techniques may be used in alternative embodiments.

An example of a portion of an ontology is provided below. The hierarchy between the various concepts is also shown. For example, "causative verbs" and "nonaction verbs" are sub-concepts of concept "verbs", which in turn is a sub-concept of concept "Grammar."

Skill→Grammar Hierarchy
I. Skill
  A. Grammar
    1. Verbs
      a. Causative Verbs
      b. Nonaction Verbs
      c. Passive
      d. Phrasal Verbs
      e. Special Verbs
      f. Verb Tenses
        i. Past
        ii. Simple Past
        iii. Present Perfect
        iv. Present Perfect Progressive
        v. Past Progressive
        vi. Past Perfect Learning resources 214 include resources that may be used to teach one or more concepts from the ontology. These resources may include skill courses, proficiency courses, skill centers, publications, reference sections, tests, activities, and the like. These resources represent the course content offered by the e-learning system. A resource may be useful for teaching one or more concepts. In one embodiment, learning resources 214 may include skill-based modules, task-based modules, reference materials, and others that may be used to teach concepts from the ontology. Examples of skill-based modules may include presentations, activities, assignments, quizzes, tests, courses, and others. An example of a task-based module is a real-world simulation. Examples of reference materials include dictionaries (such as translation dictionaries), cultural notes, and the like. Resources may be used in a variety of learning contexts such as test preparation, job specific skills training, on-the-job performance support, and the like.

Metatagging system 216 provides a bridge between concepts 212 and resources 214. For each concept in the ontology, one or more tags may be associated with the concept identifying one or more resources in resources 214 that teach that specific concept. Accordingly, using the meta-tagging system, for a particular concept, one or more resources may be determined that teach that particular concept. The form in which the resources are presented may also be determined. For each resource, one or more tags or labels may be associated with the resource identifying one or more concepts from the ontology that are taught by the resource. Accordingly, using the meta-tagging system, for a particular resource, one or more concepts taught by the resource may be determined. The meta-tags (or labels) themselves may be hierarchically organized. This metatag information is used to determine course units for a particular concept. The course units are used to develop a study plan for a user.

Examples of metatags used to describe a grammar activity are shown below: For example, a resource may be an activity related to a business memo, e.g., Business Course 6, Assignment 5, Activity 7 is a business memo with ten blanks for verbs that users have to fill in. It may follow a grammar presentation in which learners are shown the differences between the present perfect and the simple past. The metatags for this resource may be as follows:

Skill→Grammar→Verb→Verb Tenses→Past→Present Perfect
Skill→Grammar→Verb→Verb Tenses→Past→→Simple Past
Topic→Business→Marketing
Genre→Text→E-mail A more comprehensive metatag hierarchy is provided in Appendix A, the entire contents of which are incorporated by reference for all purposes.

Teacher model 110 is responsible for performing processing for providing e-learning services. Teacher model 110 provides the interface between a user and services and resources provided by the e-learning system. Teacher model 110 may comprise one or more components. In the embodiment depicted in FIG. 2, Teacher model 110 comprises a student interface component 218, a learning objectives overlays component 220, a study plan manager component 222, and a performance support interface component 224. Various other components may be provided in alternative embodiments.

Student interface 218 provides the e-learning system's interface to a user 108.

Student interface 218 acts as a conduit for passing information received from a user to the e-learning system and for passing information from the e-learning system to the user. Information received from a user may be stored in the data level of the e-learning system. For example, the information may be stored in the Student Archive or the Student Profile. The information received from a user by the student interface 218 may be used to build a student model for the user.

Student interface 218 is configured to provide feedback to the user. For example, student interface 218 may inform a user of the correctness or incorrectness of the user's responses to questions, quizzes, and others provided by the e-learning system. Student interface component 218 is also configured to track and record a user's performance and learning progress. This information may be stored in student archive 206 or student profile 202.

Learning goals concepts overlays 220 (also referred to as "rules information") comprises heuristic rules and templates that map learning objectives to concepts in ontology 212. This mapping is used to build a TCO 204 for a user based upon the user's objectives. As previously described, information identifying a user's one or more objectives is stored in student profile 202.

Study plan manager 222 is responsible for creating and maintaining a personalized study plan (or learning path) 210 for each user. For each new user of the e-learning system, study plan manager 222 is configured to build an initial study plan for the user based upon information (e.g., learning objectives of the user) provided or received from the user. For a "continuing" user or learner, study plan manager 222 is configured to monitor the user's progress and update the study plan 210 for the user as appropriate.

Study plan manager 222 may use information from student model 116 and curriculum model 112 to build an initial study plan and update the study plan for each user. For example, in one embodiment, study plan manager 222 determines concepts to be learnt by the user to achieve the user's objectives from TCO information 204 for the user. Based upon the concepts determined from the TCO and SCO 208 information, study plan manager 222 determines one or more course units for the user. Study plan manager 222 may also determine the sequencing of the course units. The sequencing may take into account temporal relationships (e.g., prerequisites), if any, between the course units. Each course unit may incorporate one or more learning resources provided by the e-learning system.

In one embodiment, study plan manager 222 is configured to build and update TCO 204 and SCO 208 for each user. Study plan manager 222 may be configured to map a user's one or more objectives (as identified by the student profile for the user) to a set of concepts from ontology 212 using learning goals concepts overlays 220. A TCO 204 may be built for the user based upon the set of concepts. Study plan manager 222 is configured to track changes to a user's objectives and to make appropriate changes to the TCO information for the user. Changes to a user's objectives may also result in changes to the user's study plan.

Study plan manager 222 is also configured to track a user's progress in the e-learning process and modify the study plan for the user as needed. As part of the tracking, study plan manager 222 is configured to update a user's SCO information 208. For example, study plan manager 222 may determine mastery ratings and confidence scores for the SCO information for a user. As previously described, information related to a user's progress may be stored in student archive 206. Study plan manager 222 may use the student archive for a user to update that user's SCO information. Modifying the study plan may involve adding a course unit to the study plan, deleting a course unit from the study plan, substituting a course unit in the study plan with another course unit, or changing the sequencing or ordering of one or more course units within the study plan.

Study plan manager 222 consults student model 116 to ensure that the user is presented with the appropriate learning resource at the right time. Based upon information stored in the TCO and the SCO, study plan manager 222 identifies concepts that a user is ready to learn while avoiding concepts that the user already knows and/or is not ready to learn as yet. In one embodiment, student plan manager 222 makes recommendations for additional activities to be performed by a user. These additional activities may include, for example, extra assignments to be performed by the user, extra practice tasks, and others. At appropriate times, the recommendations may also include skipping an activity or even a course from the study plan.

Performance support interface (PSI) 224 provides tools that a user may use to assist with the learning process. These tools may include resource search tools, translation tools, dictionaries, spell checkers, grammar checkers, simulation tools, and the like. PSI 224 may also include tools that monitor user activity, both within the e-learning system and outside the e-learning system. For example, tools may be provided for monitoring a user's interactions with a client computer and provide that information to the e-learning system such that the captured information may be used to further personalize the e-learning experience of the user. Such tools may execute on server 102 or on client 104. Examples of such tools are described in U.S. patent application Ser. No. 11/160, 098, filed Jun. 8, 2005, the entire contents of which are incorporated by reference for all purposes. PSI 224 may also provide tools and modules for monitoring and collecting information about a user's interaction with the various components of the e-learning system. The information collected via such monitoring is then used to personalize a study plan for a user.

For example, consider a scenario where a user uses a browser executing on a client system to connect to an e-learning service provider web site. Tools provided by teacher model 110 may be used to monitor the user's interactions with client system 104. For example, a browser may provide a tool bar that tracks the user's interactions. The user's interactions with modules of the e-learning system may also be monitored. Information collected from such monitoring may be stored in student archive 206 for the user. Based upon information in the student archive, study plan manager 222 may make changes to the study plan for the user when there is enough evidence to warrant such a change. The study plan manager may examine the curriculum model to find content that will address the user's needs for further practice or information. The study plan is updated based upon the new content from the curriculum model. For example, if it is determined that a user asks for several translations of gerunds and infinitives, the study plan manager may add a learning activity on gerunds and infinitives to the user's study plan. Changes to a study plan may involve adding a course unit to the study plan, deleting a course unit from the study plan, substituting a course unit in the study plan with another course unit, or changing the sequencing or ordering of one or more course units within the study plan.

Figure 3:
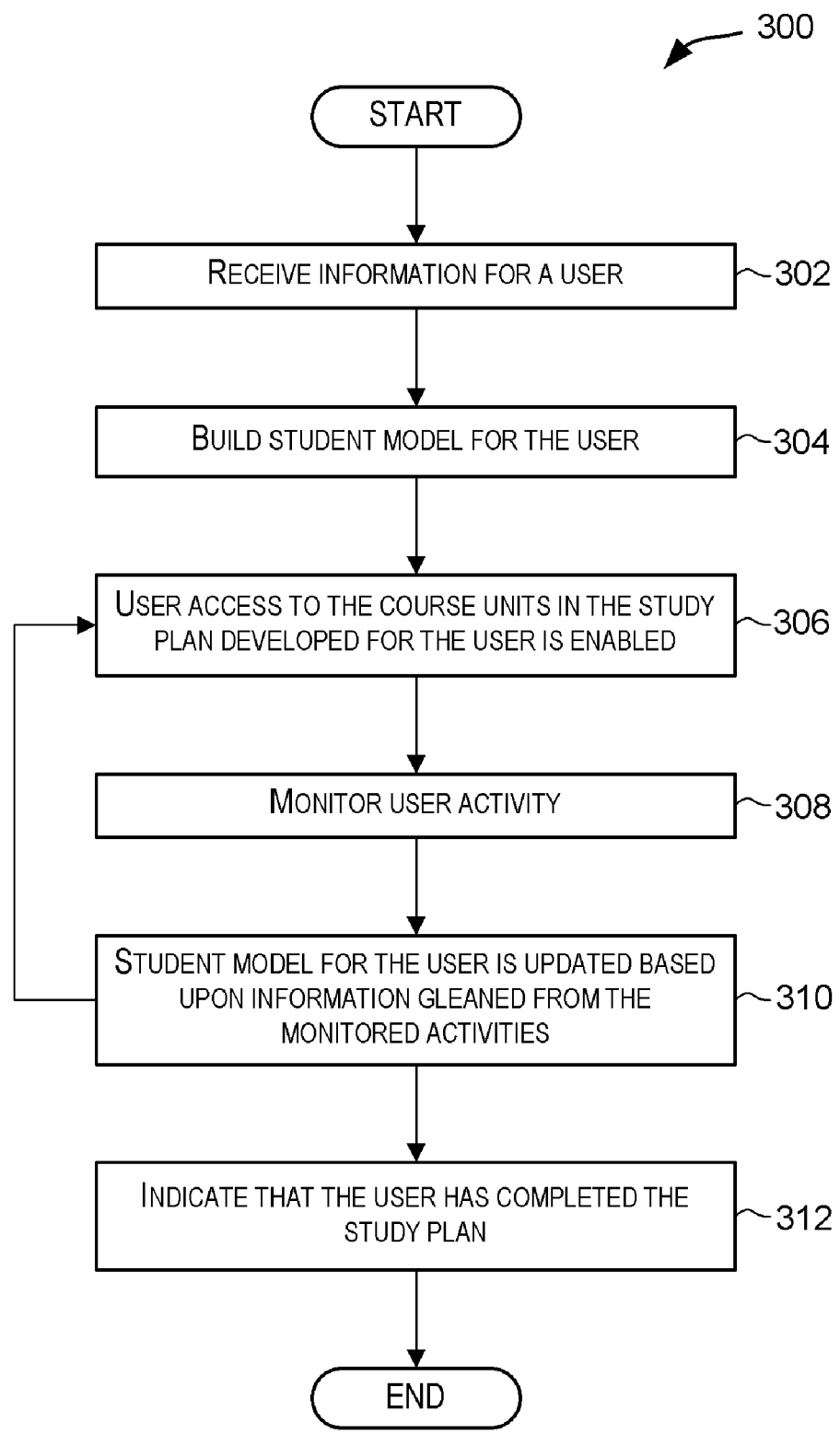
FIG. 3 depicts a simplified high-level flowchart showing a method for creating and maintaining a study plan for a user according to an embodiment of the present invention.

FIG. 3 depicts a simplified high-level flowchart 300 showing a method for creating and maintaining a study plan for a user according to an embodiment of the present invention. The processing depicted in FIG. 3 may be performed by software (code modules or instructions) executed by a processor, hardware modules, or combinations thereof. Flowchart 300 depicted in FIG. 3 is merely illustrative of an embodiment of the present invention and is not intended to limit the scope of the present invention. Other variations, modifications, and alternatives are also within the scope of the present invention. The method depicted in FIG. 3 may be adapted to work with different implementation constraints.

As depicted in FIG. 3, information for a user is received (step 302). The information identifies one or more user learning objectives and other information (e.g., time available for learning, user's native language, and others). As previously described, the information may be received via different ways such as placement tests, questionnaires, interviews, and others. For example, a user may connect to an e-learning system web site using a browser executing on the user's client system. The use's client system may be remotely located from the e-learning system and may communicate with the e-learning system via a communication network such as the Internet. In response to a user's request to participate in learning activities provided by the e-learning system, the e-learning system may output a test, a questionnaire, and others to the user. The user, using the client system, may respond to the test or questionnaire.

Figure 4:
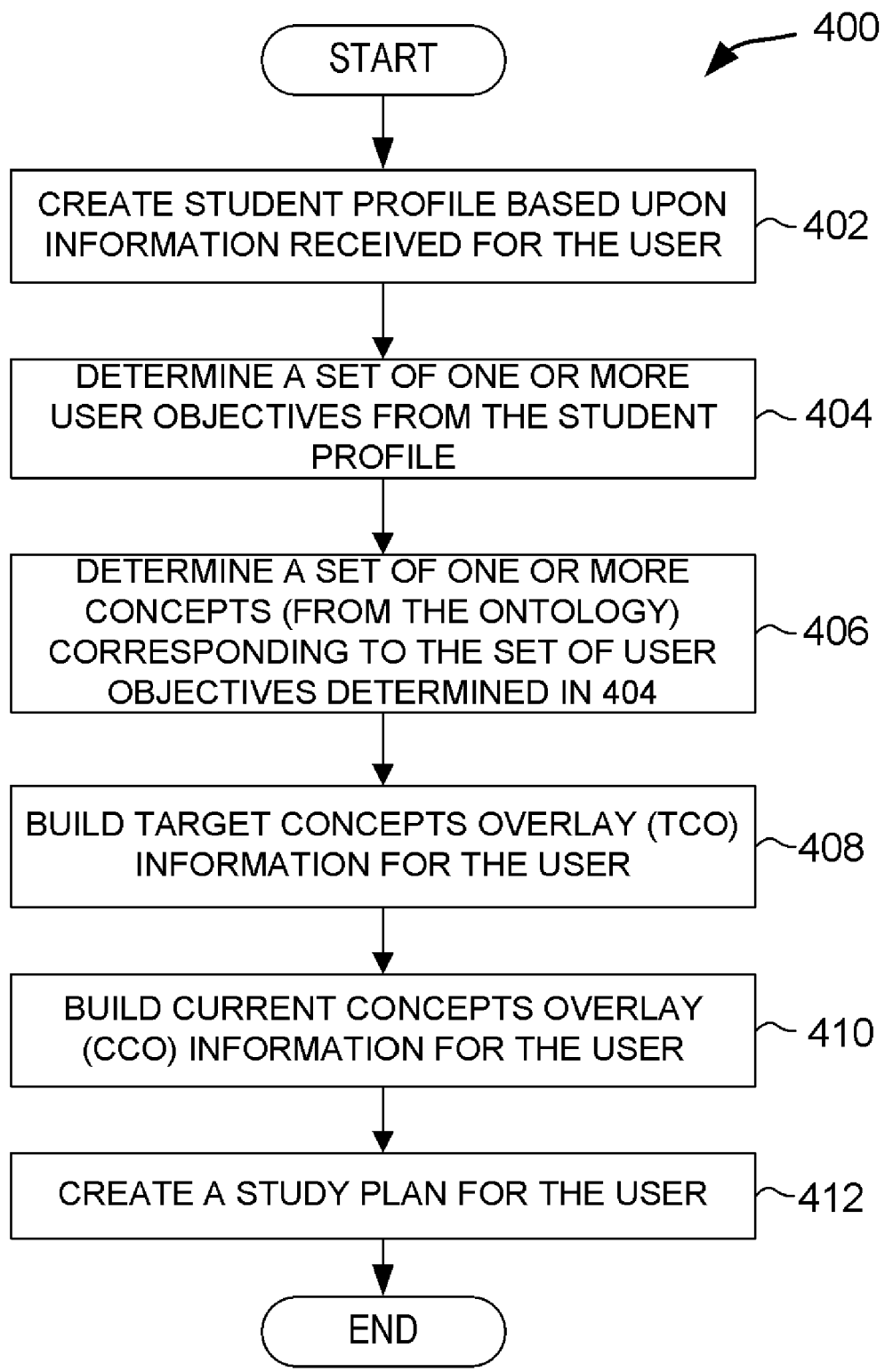
FIG. 4 depicts a flowchart 400 depicting method of building a student model according to an embodiment of the present invention.

The information received by the e-learning system is then used to build a student model for the user (step 304). FIG. 4 depicts a flowchart 400 depicting a method of building a student model according to an embodiment of the present invention. The processing depicted in FIG. 4 may be performed in step 304 of FIG. 3 according to an embodiment of the present invention. As depicted in FIG. 4, a student profile is created based upon the information received for the user (step 402). A set of one or more user objectives is then determined from the student profile information (step 404). A set of one or more concepts corresponding to the user objectives is then determined from the ontology of concepts (step 406). The learning goals concepts overlays information may be used to determine concepts corresponding to the user objectives. The set of concepts includes one or more concepts that a user is recommended to master in order to achieve the user's objectives. TCO information for the user is then built based upon the set of concepts determined in 406 (step 408). SCO information for the user may also be built (step 410). The SCO information reflects the user's understanding (as determined by the e-learning system) of concepts identified in the TCO information. The SCO information may be built based upon information received for the user. For example, based on responses to a test or questionnaire provided by the user, the e-learning system may determine the user's mastery of concepts identified in the user's TCO information and use it to build SCO information.

A study plan is then created for the user (step 412). As part of 412, resources that teach the concepts identified in the TCO are determined using the meta-tagging system. Course units are determined based upon the identified resources and a study plan built based upon the determined course units. Sequencing or ordering between one or more course units in the study plan may also determined as part of 412.

Referring back to FIG. 3, after a student model is built according to 304, user access to the course content from the study plan developed for the user is enabled (step 306). For example, a user is allowed to access course units from the study plan developed by the user using the user's client system. The user may connect to the e-learning system web site and access course units from the study plan developed for the user.

The user's activity is then monitored (step 308). The monitored activity may include the user's activity within the e-learning system. For example, a user's progress through the course units (e.g., the user's responses to course units) in the study plan developed for the user is tracked. The user's activities outside the e-learning system may also be monitored. For example, the user's interactions with the client system may be monitored, such as when the user is writing an e-mail at work, surfing the web using a browser, writing a memo using a word processor application executing on the client system, on-line conferencing, and other activities. The user's communications (e.g., telephone conversations, e-mails) may also be monitored.

The student model for the user may be updated based upon information gleaned from the monitored activities (step 310). As part of 310, the student archive is updated to reflect the user's monitored activities, both within the e-learning system and/or outside. Based upon the information in the student archive, the SCO information for the user may be updated to indicate the degree to which the user has mastered concepts from the user's TCO information as the user progresses through the learning process. The study plan for the user may also be modified based upon the monitored activities and the user's strengths and weaknesses as gleaned from the monitored user activities. For example, if the user's objectives are changed, then the study plan for the user may be modified to reflect the changed objectives. Modifying the study plan may involve adding a course unit to the study plan, deleting a course unit from the study plan, substituting a course unit in the study plan with another course unit, or changing the sequencing or ordering of one or more course units within the study plan.

Steps 306, 308, and 310 are then cycled through as the user progresses through the learning process. An indication that a user has completed the study plan may be provided when it is determined that the user has completed all the course units in the study plan and the user has mastered all the concepts recommended for the user to achieve the user's objectives (step 312).

In the manner depicted in FIG. 3, the student model (including the study plan for the user) is dynamically changed to reflect the user's objectives (which may change) and based upon the user's activities, both inside and outside the e-learning system. The user's performance strengths and weaknesses are taken into account when customizing the study plan for the user. For example, a user who has difficulty with verb tenses may have a specific course unit added to the user's study plan to address this issue. A user who excels in a particular area may have one or more course units removed from the study plan. The e-learning system thus monitors user activity and modifies the study plan for the user accordingly to provide a customized and optimal e-learning experience for each individual user. This is in contrast to traditional classroom instruction where each student goes through the same course work as other students in the class. The user is also allowed considerable control over the learning process. For example, the user may change the user's learning objectives and thus tailor the e-learning experience to suits the user's needs. A customized e-learning system is beneficial to the user since it is targeted to the particular needs of the user. Such a system enables a user to learn faster and better compared to traditional classroom instruction.

Figure 5:
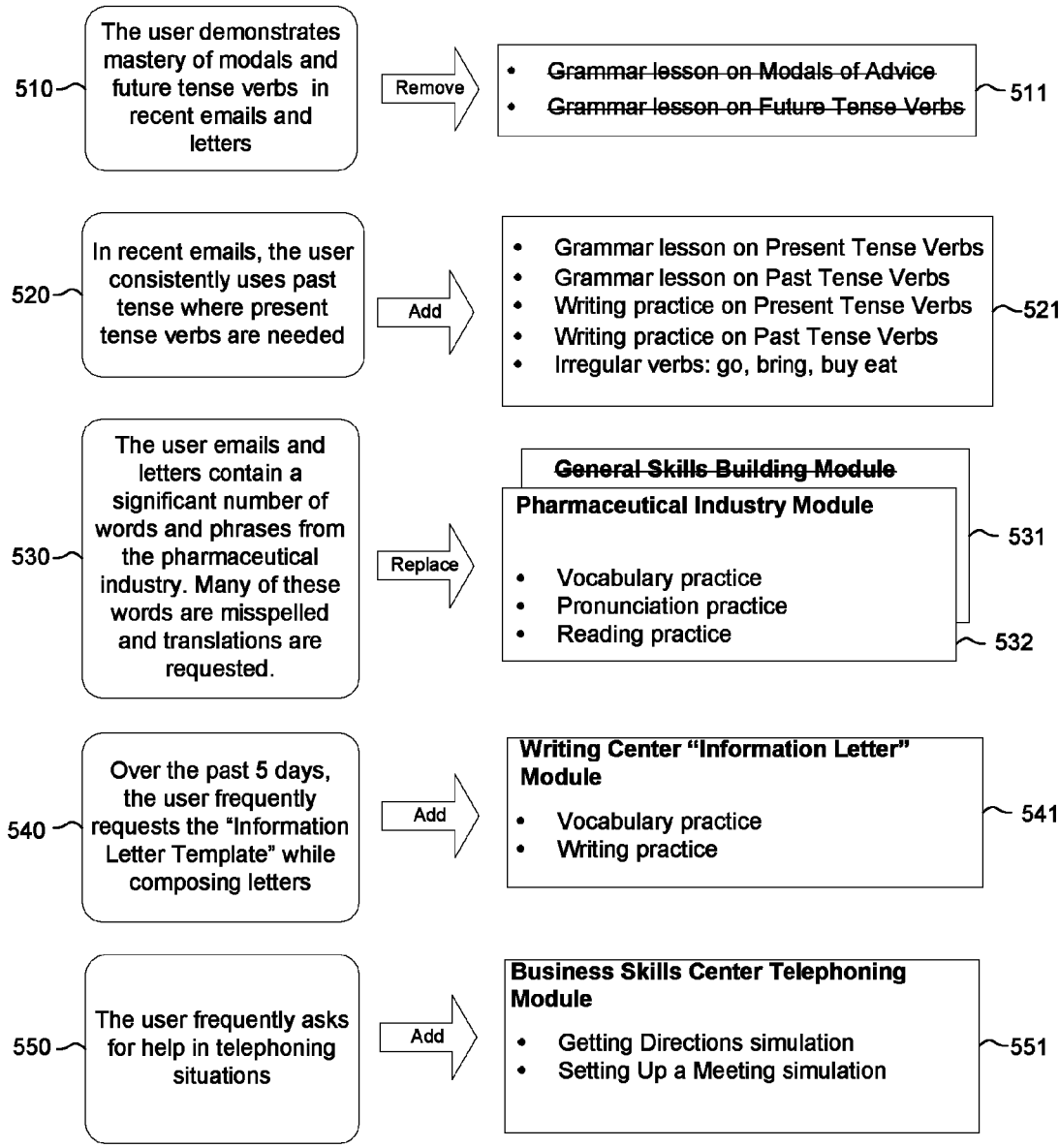
FIG. 5 shows several examples of modifications of the student study plan based on information gathered by performance support tools according to an embodiment of the present invention.

FIG. 5 shows some examples of modifications of the student study plan based on information gathered by performance support tools. More specifically, these examples show the addition, removal, and replacement of course units from a student study plan.

In a first example, the user demonstrates mastery of modals and future tense verbs 510 by using them correctly in e-mails and letters. For example, the user may demonstrate this mastery over a period of time, such as two weeks, and with a proficiency of over 90 percent (or other targeted value) of the time. As a result, the study plan manager removes all grammar lessons on modals and future tense verbs course units 511 from the student study plan.

In a second example, the user consistently uses the past tense (e.g., a percentage or targeted value such as 50 percent of the time) where present tense verbs 520 are needed. In addition, the user is having trouble with the past tense forms of the verbs: go, bring, buy, and eat. As a result, the study plan manager adds grammar lessons and writing practice course units 521 to the student study plan. In addition, a reference to irregular past tense verbs: go, bring, buy, and eat the student study plan.

Past tense is used merely as an example of an error that is monitored. The e-learning system may monitor other types of errors; these may involve rules which the system is watching for, and where a rule is not met, a violation occurs. When the past tense mistake is made, the system may make a note that a violation of a past tense rule has occurred. One or more rules may be monitored by the system at one time. Examples of rules may include any grammar, stylistic, or punctuation rule, a spelling error, a repeated word, passive voice occurrence, wrong tense occurrence, wrong plural word occurrence, or others.

In a third example, the user's e-mails and letters contain a significant number of words and phrases from the pharmaceutical industry 530, many of the words are misspelled. Many of the user's word and phrase translations are also from the pharmaceutical industry. For example, a percentage (or targeted value) such as 50 percent of the user's word and phrase translations are from the pharmaceutical industry. As a result, the study plan manager replaces the general skills building module 531 with the pharmaceutical industry module. The pharmaceutical industry module focuses on teaching English skills using vocabulary and language common in the pharmaceutical industry.

In a fourth example, over the past five days, the user used the "Information Letter Template" on four different occasions 540. As a result, the study plan manager adds writing center "Information Letter" module 541 to the student study plan.

In a fifth example, the user frequently asks for help with telephoning situations. As a result, the study plan manager adds the business skills center telephoning module to the student study plan.

In general, course units in a study plan may be substituted, added, or deleted. Furthermore, the order or sequencing of the course units in the study plan may be altered based on activities monitored by the performance support tool.

Figure 6:
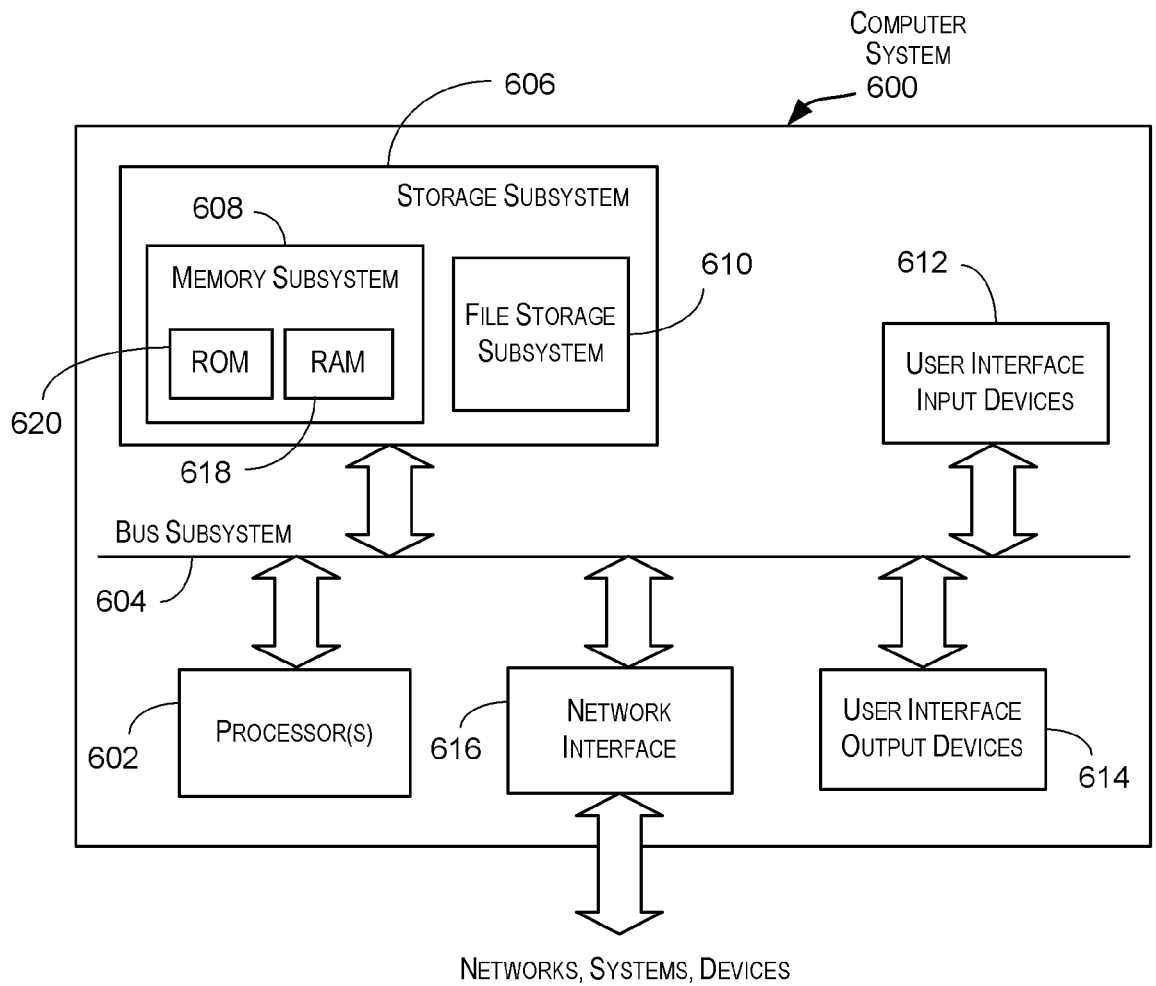
FIG. 6 is a simplified block diagram of a computer system that may be used to practice an embodiment of the present invention.

FIG. 6 is a simplified block diagram of a computer system 600 that may be used to practice an embodiment of the present invention. As shown in FIG. 6, computer system 600 includes a processor 602 that communicates with a number of peripheral devices via a bus subsystem 604. These peripheral devices may include a storage subsystem 606, comprising a memory subsystem 608 and a file storage subsystem 610, user interface input devices 612, user interface output devices 614, and a network interface subsystem 616.

Bus subsystem 604 provides a mechanism for letting the various components and subsystems of computer system 600 communicate with each other as intended. Although bus subsystem 604 is shown schematically as a single bus, alternative embodiments of the bus subsystem may utilize multiple busses.

Network interface subsystem 616 provides an interface to other computer systems, networks, and devices. Network interface subsystem 616 serves as an interface for receiving data from and transmitting data to other systems from computer system 600.

User interface input devices 612 may include a keyboard, pointing devices such as a mouse, trackball, touch pad, or graphics tablet, a scanner, a bar code scanner, a touch screen incorporated into the display, audio input devices such as voice recognition systems, microphones, and other types of input devices. In general, use of the term "input device" is intended to include all possible types of devices and mechanisms for inputting information to computer system 600.

User interface output devices 614 may include a display subsystem, a printer, a fax machine, or non-visual displays such as audio output devices, and others. The display subsystem may be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 may be configured to store the basic programming and data constructs that provide the functionality of the present invention. Software (code modules or instructions) that provides the functionality of the present invention may be stored in storage subsystem 606. These software modules or instructions may be executed by processor(s) 602. Storage subsystem 606 may also provide a repository for storing data used in accordance with the present invention. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 600 can be of various types including a personal computer, a portable computer, a workstation, a network computer, a mainframe, a kiosk, or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

APPENDIX

Metatag Hierarchy
  Genre (205562)
    Picture (205602)
      Person (205604)
      Object (205605)
    Text (205603)
      email (205606)
      mag article (205607)
      chart (205608)
      memo (205609)
      form (205610)
      telephone message (205611)
      directions (205612)
      report (205613)
      advertisement (205614)
      menu (205615)
      news article (205616)
      letter (205617)
      recipe (205618)
      fax (205619)
      fact sheet (205620)
      Postcard (208807)
      Story (208812)
      Essay (208815)
      Personal Ad (208822)
      Brochure (209349)
      Classified Ad (209350)
      Travel Article (209351)
      Article (209352)
      Presentation (210387)
      Resume (210532)
      Meeting Minutes (210533)
      dialogue (210534)
      Case Study (210598)
      interview (210698)
  Difficulty (Level) (205581)
    General English (205621)
      Beginning (205624)
        Course 1 (205625)
        Course 2 (205626)
        Course 3 (205627)
        Course 0 (209163)
      Intermediate (205628)
        Course 4 (205629)
        Course 5 (205630)
        Course 6 (205631)
      Advanced (205632)
        Course 7 (205633)
    Business English (205622)
      Intermediate (205634)
        Course 4 (205635)
        Course 5 (205636)
        Course 6 (205637)
        Course 7 (205638)
        Course 8 (205639)
      Advanced (205645)
        Course 9 (205646)
        Course 10 (205647)
      Beginning (209402)
        Course 3 (209401)
    Non-Course Content (205623)
      Beginning (205649)
      Intermediate (205650)
      Advanced (205651)
Skill (205582)
  Grammar (205652)
    Adjectives (205658)
      Adjective Order (205664)
      Demonstrative Adjectives (212900)
    Adverbs (205663)
      Frequency Adverbs (205659)
      Time Expressions (205660)
      Too-Very-So (205661)
      So-Too-Not Either-Neither (205662)
      So-Such-Too-Enough (208418)
      Of Sequence (217156)
      Possibility-Probability (218160)
      Adverbs with -ly (218168)

APPENDIX-continued

Articles (205665)
    Clauses (205674)
      Relative(adjective)Clauses (205669)
        with Whose-Where-When (205666)
        with Object Pronouns (205667)
        With Subject Pronouns (205668)
        reduced relative clauses (224509)
      Noun Clauses (205672)
        Question-Word Clauses (205670)
        That Clauses (205671)
      Time Clauses (207470)
        Past and Present (207469)
    Comparisons (205677)
      As . . . As (205678)
      Comparatives (205679)
      Superlatives (205680)
    Conditional Sentences (205681)
      Real(presentandfuture) (205682)
      Unreal(presentandfuture) (205683)
      Unreal(past) (205684)
    Connectors (205685)
      Adding more Info (205686)
      Paired Conjunctions (205687)
        Either . . . or (205688)
        Neither . . . nor (205689)
        Both . . . And (205690)
        Not only . . . but also (205691)
      Showing Cause and Effect (205692)
      Showing Contrast-Opposition (205693)
      Showing Similarities-Differences (205694)
      Showing Time Relationships (205695)
      Conjunctions (219007)
    Gerunds and Infinitives (205696)
    Miscellaneous (205698)
    Modals (205699)
      Ability(can-could) (205700)
      Advice(should-ought to-had better) (205701)
      Necessity(must have to-need to) (205702)
      Past Modals (could-would-should+have) (205703)
      Permission (may-can) (205704)
      Possibility-probability (205705)
      Request(can-could-would) (205706)
      Metatag (209628)
      Metatag (216275)
    Negative Forms (205707)
    Nouns (205708)
      Countable and uncountable nouns (205709)
      Nouns as Modifiers (205710)
      Possesive nouns (205711)
      singulars and plurals (205712)
    Prepositions (205715)
      of Place (205716)
      of Place (205717)
      of Time (205722)
      with Verbs and Adjectives (205723)
    Pronouns (205724)
      Object Pronouns (205675)
      Others-another (205720)
      Possessive Adjectives (205721)
      Demonstrative Pronouns (205725)
      Possessive Pronouns (205726)
      Reflexive Pronouns (205727)
      Subject pronouns (205728)
      That to talk about ideas (205729)
      Indefinite Pronouns (218215)
      Reciprocal Pronouns (218316)
    Quantifiers (205730)
    Question Forms (205732)
      Tag Questions (205733)
      Questions with question words (205734)
      Yes-no questions (205735)
    Reported Speech (205736)
      Commands-Requests (205738)
      Questions (205739)
      Statements (205740)
    Subject-Verb Agreement (205741)
    There is-there are (205742)
    Verbs (205743)
      Causative Verbs (205744)
      Nonaction Verbs (205745)

APPENDIX-continued

Passive (205746)
Phrasal Verbs (205747)
Special Verbs (205748)
    Be (205749)
    Hope (205750)
    prefer - would rather (205751)
    make vs do (205752)
    Wish (205753)
    Wonder (205754)
    used to (208391)
    Let's (216500)
Verb Tenses (205755)
    Past (205756)
       Simple Past (205757)
       Present Perfect (205758)
       Present Perfect Progressive (205759)
       Past Progressive (205760)
       Past Perfect (205761)
       Metatag (205762)
    Present (205763)
       Simple Present (205764)
       Present Progressive (205765)
       Imperatives (212196)
    Future (205767)
       Be going to-Will (205768)
       Future Progressive (205769)
       Future Perfect (205770)
       Simple Present (ftr) (205771)
       Present Progressive (ftr) (205772)
       Metatag (205773)
Verbs of Appearance (205774)
Direct and Indirect objects (206757)
Contractions (220922)
Vocabulary (205653)
   Adjectives and Adverbs (205776)
   Expressions (205777)
   Nouns (205778)
   Verbs (205779)
      Phrasal Verbs (205780)
   Idioms (205781)
   Miscellaneous (205782)
   Numbers (212381)
      Ordinal Numbers (220089)
   Prepostions (212792)
      of Place (218586)
   Alphabet (216293)
   Quantifiers (217824)
Expressions (205654)
   Asking for and giving opinions (206762)
   Preference (206792)
   Suggestions (207534)
   Noun phrases . . . Verb phrases (207631)
   Changing or Introducing a Topic (207821)
   Disagreeing Politely (208831)
   Complaining (209108)
   Unexpected Information (209130)
   Greetings (212120)
   Asking for and Giving Information (212121)
      Jobs and Companies (224470)
   Introducing (212122)
      Self-Introductions (224473)
   Expressing Likes and Dislikes (212444)
   Closing a Conversation (212449)
   Exclaiming (212453)
   Asking for Clarification (212587)
   Requests (213776)
   Location (213777)
   Apologies (213870)
   Correcting (213961)
   Confirming (213962)
   Describing Physical or Emotional Condition (214167)
   Agreeing and Disagreeing (214272)
   Sequence (214364)
   Talking about Abilities (214971)
   Asking about and Describing a Problem (214972)
   Telephone Language (214975)
   Duration (215203)
   Thanking (215204)
   Positive and Negative Expressions (217071)
   Reminding (217380)
   Expressing Wants and Needs (217820)
   Expressing Understanding (218170)
   Ordering (218216)
   Hesitating (218501)
   Asking for Permission (218502)
   Complimenting (218513)
   Congratulating (218736)
   Paraphrasing (218907)
   Explaining (218908)
   Inviting (218909)
   Asking for and Giving Directions (220072)
   Buying (220088)
   Interrupting (221285)
   Expressing Surprise (221480)
   Asking about Quantity (222416)
   Asking about and Describing People (222444)
   Making a Proposal (222881)
   Accepting and Rejecting Proposals (222882)
   opening a meeting (222963)
   Scheduling (224524)
   Hotel Language (225240)
   Asking for and Giving Advice (225289)
   Asking for and Offering Assistance (225290)
   Explaining Charts and Graphs (225291)
   Emphasizing the Need for Action (225292)
Speaking (205655)
   Pronunciation (205775)
      Segmentals (222819)
        [b]ig (222820)
        [v]an (222821)
        b[oo]k (222823)
        t[oo] (222824)
        c[a]t (222825)
        y[e]s (222826)
        [ch]air (222827)
        [j]ust (222828)
        [c]old (222829)
        [g]old (222830)
        [d]ay (222831)
        [th]is (222832)
        m[y] (222833)
        n[ow] (222834)
        b[oy] (222835)
        [f]an (222836)
        [h]ello (222837)
        h[o]t (222838)
        b[ir]d (222839)
        [l]eft (222840)
        [r]ight (222841)
        [m]e (222842)
        [n]ew (222843)
        si[ng] (222844)
        mea[su]re (222845)
        [sh]e (222846)
        n[o] (222847)
        s[aw] (222848)
        [p]ay (222849)
        s[ay] (222853)
        [s]ell (222855)
        [th]ink (222857)
        [z]oo (222859)
        s[ee] (222862)
        s[i]t (222863)
        [t]ip (222866)
        [w]e (222870)
        [y]es (222871)
        b[u]s (222875)
      Consonants (223332)
        Consonant Clusters (223331)
          Voiced and Unvoiced Sounds (224437)
        Spelling and Pronunciation (224438)
          -ed Endings (224439)
          Hard and Soft Letters (224440)
          Long and Short Vowels (224441)
          s Endings (224442)

APPENDIX-continued

Suprasegmentals (224443)
  Intonation (224444)
    Asking for Repetition and Confirmation (224445)
    Lists (224446)
    Thought Groups (224447)
    Rising and Falling (224448)
  Linking (224449)
    Consonant + Same Consonant (224450)
    Consonant + Vowel (224451)
    Consonant + Y (224452)
    Vowel + Vowel (224453)
  Reductions (224454)
    Contractions (224455)
  Rhythm (224456)
    Function Words (224457)
  Stress (224458)
    Noun vs. Verb (224459)
    Suffixes (224460)
    Unstressed Syllables (224461)
    Compound Nouns (224462)
    Content Words (224463)
    Function Words (224464)
    Numbers (224465)
    Sentence Focus (224466)
    Stressed Syllables (224467)
Conversation (205783)
Story (218169)
Listening (205656)
  idioms (210255)
  Expressions (210256)
  Song (212115)
  Short Listening (212116)
  Multiple Choice (212117)
  Short Story (212219)
  Numbers (222868)
  Listening Strategies (225238)
    Listening for Gist (225239)
Reading (205657)
Writing (206818)
Interacting with Others (207876)
Topic (205583)
  Arts and Entertainment (205877)
    Art (205878)
    Dance (205879)
    Literature (205880)
    Movies (205881)
    Museum (205882)
    Music (205883)
    Television (205884)
    Theater (205885)
  Business (205886)
    Advertising (205887)
    Business Culture (205888)
    Finance (205889)
    Human Resources (205890)
    Jobs (205891)
    Marketing (205892)
    Meetings (205893)
    Negotiations (205894)
    Presentations (205895)
    R and D (205896)
    Sales (205897)
    Socializing (205898)
    Strategy and Planning (205899)
    Business Trends (205900)
    Organizational Structure (210257)
    Planning Events (224431)
    Telephone (224432)
  Communication (205901)
    Expressing Necessity (210258)
    Expressing possibility (210259)
    Expressing Concern (210260)
    Clarifying (210261)
    Offering Assistance (210262)
    Expressing Sympathy (210263)
    making requests (210264)
    Giving Opinions-Agreeing and disagreeing (210265)
  Culture (205902)
    Customs (205903)
      Romance (206781)
    Holidays (205904)
    Trends (205905)
    Festivals (207533)
  Daily Life (205906)
    Banking (205907)
    Post Office (205908)
    Shopping (205909)
      Money (209573)
  Economics (205910)
  Entertainment (205911)
    Movies (205912)
    Music (205913)
    Television (205914)
    Playground (212195)
  Fashion (205915)
    Clothing (205916)
      Colors (209572)
  Food and Drink (205917)
  Health (205918)
  Home (205919)
  People (205920)
    Feelings (205921)
    Describing People (205922)
      personalities (206752)
    Famous People (205923)
    Hobbies (205924)
    Likes and Dislikes (205925)
    Socializing (205926)
    Friends (210689)
    Parts of the Body (212907)
  Places (geography) (205927)
  Psychology (205928)
  Relationships (205929)
    Family (205930)
    Friends (205931)
    Romance (205932)
      Dating (208426)
      Marriage (207866)
  School (205933)
    University (205934)
      University Life (208819)
    Elementary (212124)
  Science (205935)
    Space (205936)
  Society (205937)
    Government and Law (205938)
    Community (212510)
  Sports (205939)
    Women's (205940)
    Camping (213682)
  Technology (205941)
    Computers (206769)
      internet (206768)
  Telephone (205943)
  Time (205944)
  Travel (205945)
    Transportation (205648)
      Airport (213965)
    Hotels (205946)
    Restaurants (205947)
    Landmarks (207615)
  Weather (205948)
    Time (218904)
      Seasons (218905)
  Zodiac sign (206827)
  work (207185)

What is claimed is:

1. A method comprising:

storing, at a server system, curriculum information comprising information identifying a plurality of concepts and information identifying a plurality of resources;

receiving, at the server system, information gathered from a student, the information identifying a set of one or more student objectives;

determining a set of one or more concepts from the plurality of concepts based upon the set of student objectives; and creating a study plan for the student based upon the curriculum information and the set of one or more concepts, the study plan comprising one or more course units, each course unit accessible by the student from the server using a client system coupled to the server via a communication network.

2. The method of claim 1 further comprising:
monitoring the student's activity;
storing information indicative of the student's activity;
for each concept in the set of concepts, storing first information indicative of the student's understanding of the concept; and
updating the first information for at least one concept in the set of concepts based upon the monitored student's activity.

3. The method of claim 2 wherein the first information for a concept comprises rating information indicative of the student's understanding of the concept and a confidence score indicative of a degree of confidence in the rating information.

4. The method of claim 2 wherein the monitoring comprises:
monitoring the student's input at the client system used by the student.

5. The method of claim 2 wherein the monitoring comprises:
monitoring the student's response to at least one course unit from the study plan.

6. The method of claim 2 further comprising:
modifying the study plan based upon the monitored student activity.

7. The method of claim 6 wherein modifying the study plan comprises at least one of including an additional course unit not already included in the study plan, deleting a course unit from the study plan, replacing a course in the study plan with a different course unit, or changing an order of one or more course units in the study plan.

8. The method of claim 1 wherein:
the curriculum information comprises metatag information, the metatag information providing an association between the plurality of concepts and the plurality of resources; and
creating the study plan comprises:
determining, from the plurality of resources, a first set of one or more resources corresponding to the set of concepts using the tag information;
building the study plan based upon the first set of resources.

9. The method of claim 1 comprising:
storing rules information comprising a set of one or more rules for mapping a student objective to one or more concepts from the plurality of concepts; and
wherein determining the set of one or more concepts based upon the set of student objectives comprises using the rules information to determine the set of concepts from the plurality of concepts.

10. A method comprising:
storing curriculum information comprising information identifying a plurality of concepts and information identifying a plurality of resources;
receiving information for a student identifying a first student objective;
creating a student model for the student, the student model comprising:
information identifying a set of one or more concepts determined from the plurality of concepts based upon the first student objective;
information identifying a study plan for the student, the study plan determined based upon the curriculum information and the set of one or more concepts, the study plan comprising one or more course units, each course unit accessible by the student from a server using a client system coupled to the server via a communication network.

11. The method of claim 10 further comprising:
monitoring the student's activity;
wherein the student model comprises:
information indicative of the student activity;
first information identifying, for each concept in the set of concepts, the student's understanding of the concept, wherein the first information is updated for at least one concept in the set of concepts based upon the information indicative of the student activity.

12. The method of claim 11 further comprising:
providing a set of one or more tools for monitoring the student activity.

13. The method of claim 12 wherein the set of tools comprises a tool for monitoring the student's input at the client system.

14. The method of claim 12 wherein the set of tools comprises a tool for monitoring the student's response to at least one course unit from the study plan.

15. The method of claim 11 further comprising modifying the study plan based upon the information indicative of the student activity and the first information.

16. The method of claim 10 wherein the curriculum information comprises metatag information, the metatag information providing an association between the plurality of concepts and the plurality of resources, the method further comprising:
determining, from the plurality of resources, a first set of one or more resources corresponding to the set of concepts using the tag information; and
building the study plan based upon the first set of resources.

17. The method of claim 10 comprising:
storing rules information comprising a set of one or more rules for mapping a student objective to one or more concepts from the plurality of concepts; and
wherein determining the set of one or more concepts based upon the set of student objectives comprises using the rules information to determine the set of concepts from the plurality of concepts.

18. The method of claim 10 further comprising:
receiving information identifying a second student objective; and
modifying the study of plan in response to receiving the information identifying the second student objective.

19. A method comprising:
storing, at a server system, curriculum information comprising information identifying a plurality of concepts and information identifying a plurality of resources;
receiving, at the server system, information gathered from a first student, the information identifying a set of one or more first student objectives;
determining a first set of one or more concepts from the plurality of concepts based upon the set of first student objectives;
creating a first study plan for the first student based upon the curriculum information and the first set of one or more concepts, the study plan comprising one or more course units, each course unit accessible by the first student from the server using a client system coupled to the server via a communication network;
receiving, at the server system, information gathered from a second student, the information identifying a set of one or more second student objectives;

determining a second set of one or more concepts from the plurality of concepts based upon the set of second student objectives; and creating a second study plan for the second student based upon the curriculum information and the second set of one or more concepts, wherein the second study plan is different from the first study plan.

20. The method of claim 19 comprising:

monitoring the first student activity when the first student accesses a course unit in the first study plan; and modifying the first study plan based upon the monitored first student activity.

* * * * *